(12) United States Patent
Völker

(10) Patent No.: US 6,273,563 B1
(45) Date of Patent: Aug. 14, 2001

(54) SPRING ELEMENT AND INK CARTRIDGES THEREWITH

(75) Inventor: Martin Völker, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/600,258

(22) PCT Filed: Jan. 12, 1999

(86) PCT No.: PCT/EP99/00136

§ 371 Date: Jul. 13, 2000

§ 102(e) Date: Jul. 13, 2000

(87) PCT Pub. No.: WO99/38695

PCT Pub. Date: Aug. 5, 1999

(30) Foreign Application Priority Data

Jan. 29, 1998 (DE) .......................................... 298 80 146 U

(51) Int. Cl.[7] ..................................................... B41J 2/175
(52) U.S. Cl. ................................................................ 347/86
(58) Field of Search ................................. 347/7, 85, 86, 347/87

(56) References Cited

U.S. PATENT DOCUMENTS

| | | | |
|---|---|---|---|
| 4,422,084 | 12/1983 | Saito | 347/7 |
| 5,325,119 | 6/1994 | Fong | 347/86 |
| 5,359,353 | 10/1994 | Hunt et al. | 347/86 |
| 5,754,207 | * 5/1998 | Gragg et al. | 347/86 |
| 5,969,734 | * 10/1999 | Tamano | 347/85 |

FOREIGN PATENT DOCUMENTS

| | | |
|---|---|---|
| 583 153 | 2/1994 | (EP) . |
| 583 154 | 2/1994 | (EP) . |

* cited by examiner

Primary Examiner—N. Le
Assistant Examiner—Anh T. N. Vo
(74) Attorney, Agent, or Firm—Keil & Weinkauf

(57) ABSTRACT

The invention relates to ink cartridges having spring elements according to the invention and a spring element itself having a relatively constant spring force over a substantial part of the overall spring travel and comprising at least one first individual element of substantially S-bow or S-curve shape with a first spring characteristic and at least one second individual element of substantially single-bow or curve shape with a second spring characteristic, a regulating spring characteristic with a relatively constant spring force being obtained over the substantial part of the spring travel. Practical embodiments with frame parts and/or cover parts can be favorably produced by injection molding. The individual elements are provided with differing cross-sectional dimensions over their length for reducing stress at bending points susceptible to stress. The spring elements can be used for ink cartridges for removal of the liquid or paste while at the same time generating negative pressure, or else generally for keeping pressure constant in pneumatic and hydraulic systems in general.

19 Claims, 7 Drawing Sheets

SPRING ELEMENT AND INK CARTRIDGES THEREWITH

FIELD OF THE INVENTION

The invention relates to a spring element according to the preamble of claim 1 and to an ink cartridge therewith.

DESCRIPTION OF THE PRIOR ART

Such a spring element for ink cartridges is disclosed in U.S. Pat. No. 5,325,119. Here, the spring element is in the form of a coil and arranged between two plates which control the pressure in the ink cartridge. This is intended to achieve a nonlinear characteristic of the spring function.

U.S. Pat. No. 5,359,353 furthermore describes a compression spring which is composed of spring bows fastened one over the other and which presses two plates apart. For ink reservoirs in printers, this plate and compression-spring arrangement is provided in an ink bag, in which a predetermined negative pressure has to be maintained in order to prevent uncontrolled discharge from the ink bag. The compression spring should also maintain the negative pressure, and keep it as constant as possible, during and after the removal of ink.

The known double bowed spring is not capable of this, since the spring force increases with the compression travel over the strain path of the spring, with the result that the level of negative pressure likewise increases. Furthermore, the double bowed spring is made of metal and must be specially assembled in order to be given its shape and then be fastened to the cover parts.

For the nevertheless unsatisfactory function, the relatively great effort involved in production and assembly is scarcely commercially justifiable.

Ink cartridges of this kind comprise in principle a protective housing with a print head for ink removal and an ink-receiving space which is connected to said print head, is at least partly flexible and in which the spring element maintaining negative pressure is contained.

Spring elements having a relatively constant spring force over a substantial part of the spring travel can also be advantageously used for other applications, for example in measurement and control technology in the automotive sector and generally in pneumatic or hydraulic equipment.

SUMMARY OF THE INVENTION

It is an object of the present invention to provide a spring element characterized in this way.

We have found that this object is achieved by a spring element having at least one individual element and having a relatively constant spring force over a substantial part of the overall spring travel, the spring element essentially having an S-bow shape and a spring characteristic which rises and falls over the overall spring travel, and comprising at least one further individual element, which has a single-bow shape and a spring characteristic which rises over the substantial part of the spring travel of the spring element.

This provides a simple, serviceable spring element.

In a practical configuration, the at least one further individual element may be integrated into the S-bow-shape individual elements, in particular as a spring loop within the length of the spring. This reduces the number of individual elements of the spring element and simplifies its production.

The spring travel of the at least one further individual element may expediently be approximately half the overall spring travel, with the result that the substantially constant spring force is realized over the substantial part of the spring travel of the spring element.

It is also conceivable, however, to design other subregions of the overall spring travel with suitable spring characteristics of the individual elements for producing an approximately constant spring force.

In practice, the individual element or elements of the spring element may be arranged and fastened between two frame parts as pressure plates.

It is advantageous in production terms to form the spring element with the frame parts or pressure plates by injection molding.

The individual element or elements may advantageously have over its or their length cross-sectionally differing widths with approximately constant height and consequently have a substantially constant diffusion of stress at the surface of the individual elements.

In an expedient arrangement, the individual elements of S-bow shape may comprise a central element and two side elements spaced equally apart from it, the central element having approximately double the spring force relative to the spring force of each side element.

It is favorable for reasons of symmetry if there are provided two further individual elements which are effective in the substantial part of the spring travel, in particular from about half the overall spring travel of the spring element.

It is likewise favorable if the further individual element or elements are arranged approximately symmetrically with respect to the central element.

It is favorable in terms of injection molding technology if at least one of the frame parts is designed as a cover part with cutouts, which have the shape of the projection of the S-bow-shape individual elements.

A further advantage is obtained if the spring element is composed of a plastics material which has high crystallinity, a high yield point and, below the yield point, high resilience.

This ensures excellent resilient properties over a long service life.

A polyacetal, in particular a polyoxymethylene (POM), which can be processed well by injection molding, may be expediently used for this.

It is advantageously also possible to use other thermoplastics with resilient properties.

The spring element according to the invention can be used advantageously for the production of ink cartridges as mass-produced articles and their function.

The invention furthermore relates to an ink cartridge having the features of claim 17.

It is also expedient to arrange the individual element or elements of the spring element or elements between two frame parts and to fasten them to the latter.

It is also surprisingly cost-effective if at least one of the frame parts is made with cutouts for forming the shapes of the individual elements and consequently the at least one spring element is produced with at least one frame part in one piece by injection molding, in particular from polyoxymethylene.

It has been found to be decidedly advantageous if the at least one spring element is composed of a plastics material which has high crystallinity, a high yield point and, below the yield point, high resilience, in particular of a polyacetal.

Use of the spring element according to the invention in printing-ink cartridges is also equally advantageous.

BRIEF DESCRIPTION OF THE DRAWINGS

Exemplary embodiments of spring elements of the invention are described below and represented in the drawing, in which:

FIG. 1 shows a plan view of a frame part of a spring element according to FIG. 1.

DETAILED DESCRIPTION OF THE INVENTION

Figure 1:
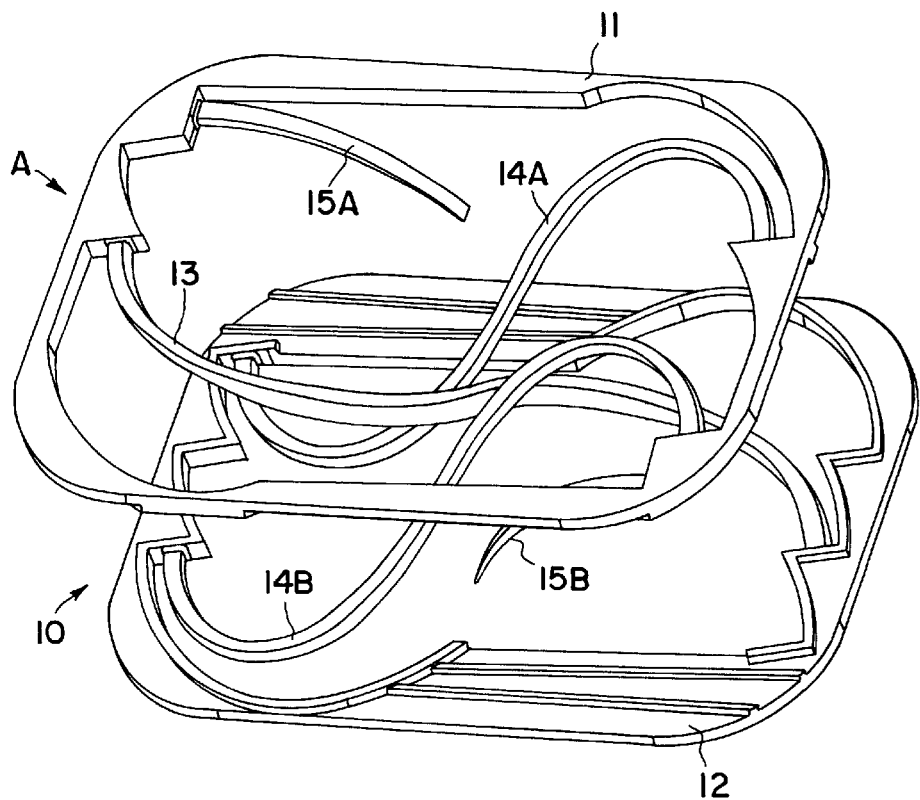
FIG. 1 shows a spring element with frame parts according to the invention in a perspective view.

FIG. 1 shows a spring element 10 with frame parts 11 and 12. Between the frame elements 11 and 12 there extend three S-bow-shape individual elements 13–14A and B, of which 13 is the central element and 14A and 14B are the side elements. The individual elements 13, 14A and B are connected by their ends to the frame parts 11 and 12, ie. either suitably fastened or produced in one piece with the frame parts 11 and 12 by injection molding. It is also conceivable to use only a single individual element or at least two individual elements if the same has or have the specified spring characteristic curve. As can be seen in FIG. 1, the individual elements may advantageously be designed with differing cross sections over their length, expediently with differing widths (b1–b3 in FIG. 3) with approximately constant height of the cross-sectionally rectangular shape. Consequently, different surface stresses of the individual elements 13, 14A and B can be reduced, with the result that they remain in the elastic deformation range, which is particularly important for plastics material. Particularly suited as the plastics material is a polyacetal, in particular a polyoxymethylene (POM) with resilient properties, that is to say with high crystallinity, a high yield point and, below the yield point, high resilience. The POM material Ultraform® W 2320 has been found to be particularly suited for the spring elements 10 described. (Ultraform® is a registered trademark of Ultraform GmbH, Ludwigshafen). Other thermoplastics with resilient properties are also suited as the material.

As further individual elements, there may be provided the single-bow-shape springs 15A and B, which should be arranged approximately symmetrically with respect to the central element 13 and which are in each case fastened only at one end, springs 15A and 15B, respectively on the frame part 11 or 12, or are formed in one piece therewith, and the other ends of which reach approximately half way into the intermediate space between the frame parts 11 and 12 and consequently can become effective only for instance when reaching the second half of the overall spring travel. These springs 15A and B are designed with substantially constant width and height in cross section but, for reasons of stress reduction, they may also be designed with a tapering tip.

Figure 2:
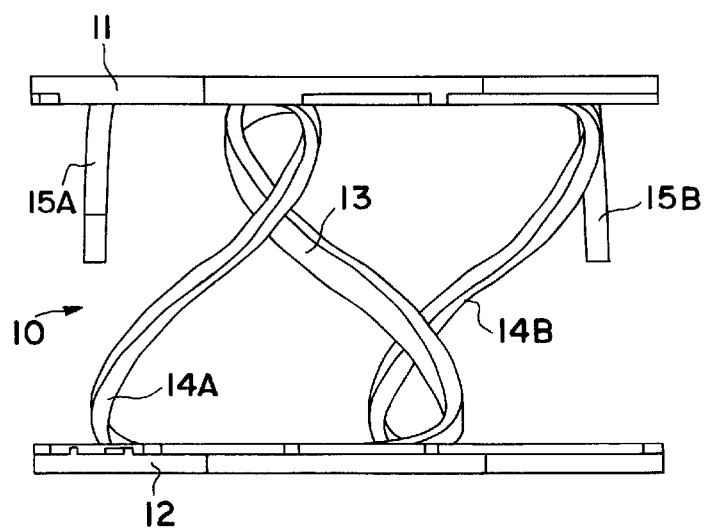
FIG. 2 shows a side view A of the spring element according to FIG. 1.

FIG. 2 shows a view A of the spring element 10 from FIG. 1. The individual elements: central element 13 and side elements 14A and 14B as volute springs and the single-bow-shape springs 15A and 15B, which in this view project rectilinearly from the frame part 11, can be easily seen.

Figure 3:
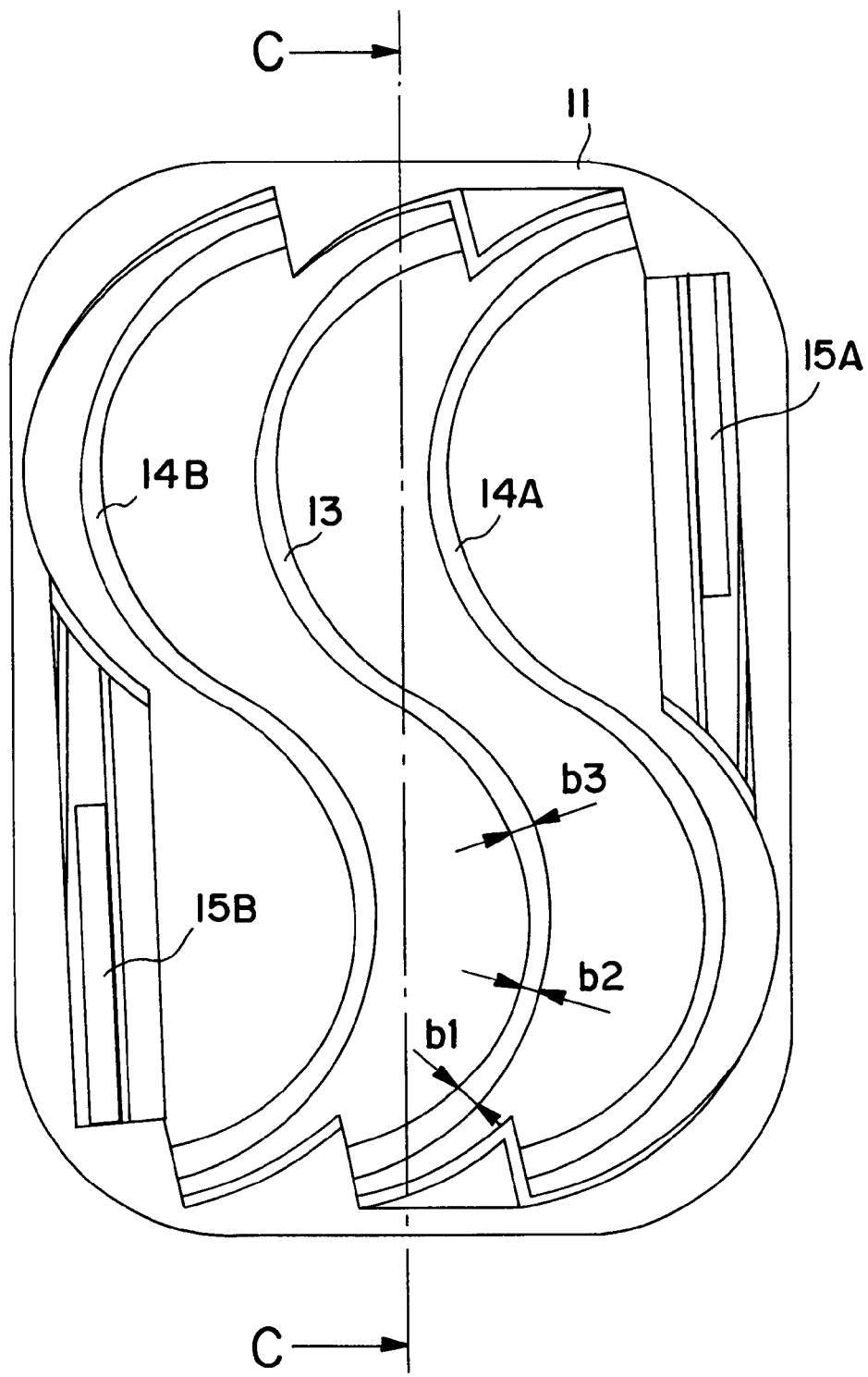
FIG. 3A shows a plan view of a cover part instead of the frame part of a spring element according to FIG. 1.

In FIG. 3 it can be seen that there is a change in width, for example b1>b2<b3, over the length of each individual element 13, 45 14A, 14B for stress reduction or compensation, as already mentioned above.

By reducing the width, high stresses, which occur primarily at the surface, can in this case be reduced into an approximately constant stress range of about 40 (Mega Pascal) MPa or N/mm².

Figure 3A:
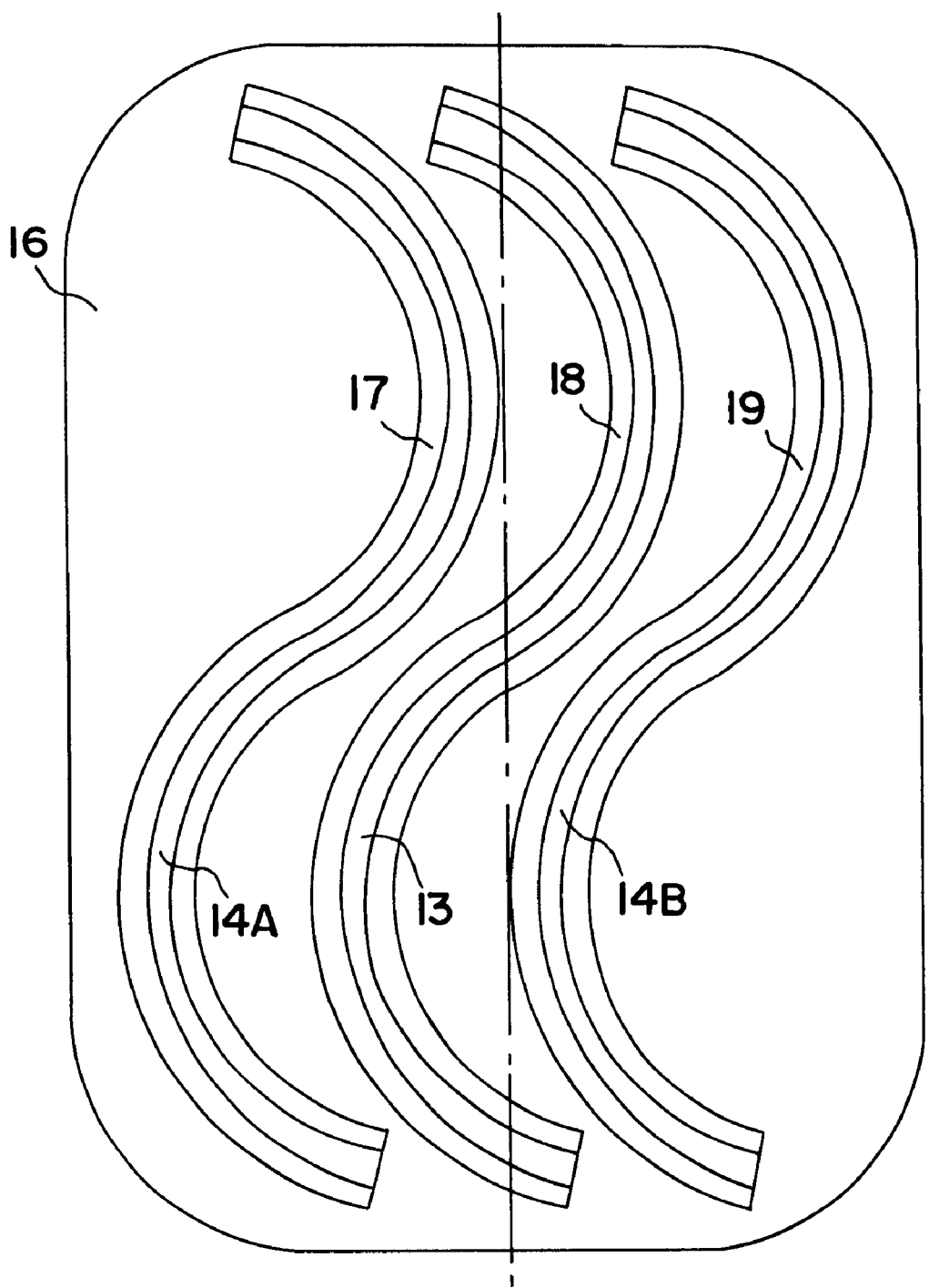

FIG. 3A shows the plan view of a spring element with a substantially closed cover part 16 with S-bow-shape cutouts 17, 18 and 19, in which there can be seen, in sequence, the S-bow-shape individual elements 14B, 13 and 14A. The parts of the mold for shaping the S-bow-shape individual elements 13, 14A and B must be passed through these cutouts. The further individual elements 15A and B are shaped by lateral slides.

Figure 4:
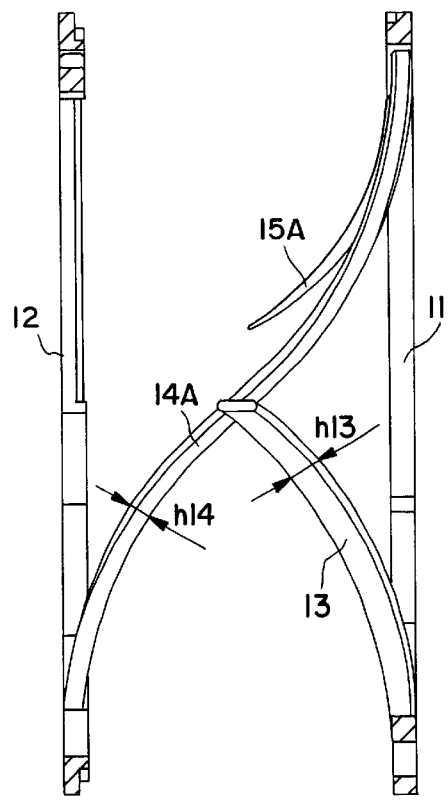
FIG. 4 shows a sectional view C—C according to FIG. 3.

The sectional view according to FIG. 3 is represented in FIG. 4. In this view, the S-bow-shape side element 14A and the further individual element 15A can be seen in full and the central element 13 can be seen only in half of its full form, in particular their relative sizes can be seen.

It can be seen how the height $h13$ is approximately twice the height $h14$, the spring force of the central element 13 being set as approximately double that of each individual element 14A, 14B. Any other desired ratio can also be readily set by correspondingly changing the dimensional relationships of the individual springs 13 and 14A and B.

The S-bow-shape is represented by way of example as approximately the shape of an arc of a circle. In principle, any constant curve shape is suitable, provided that there is a central symmetry with respect to the center of the individual element, which in the exemplary embodiments also coincides with the center plane between the frame and/or cover parts.

Figure 5:
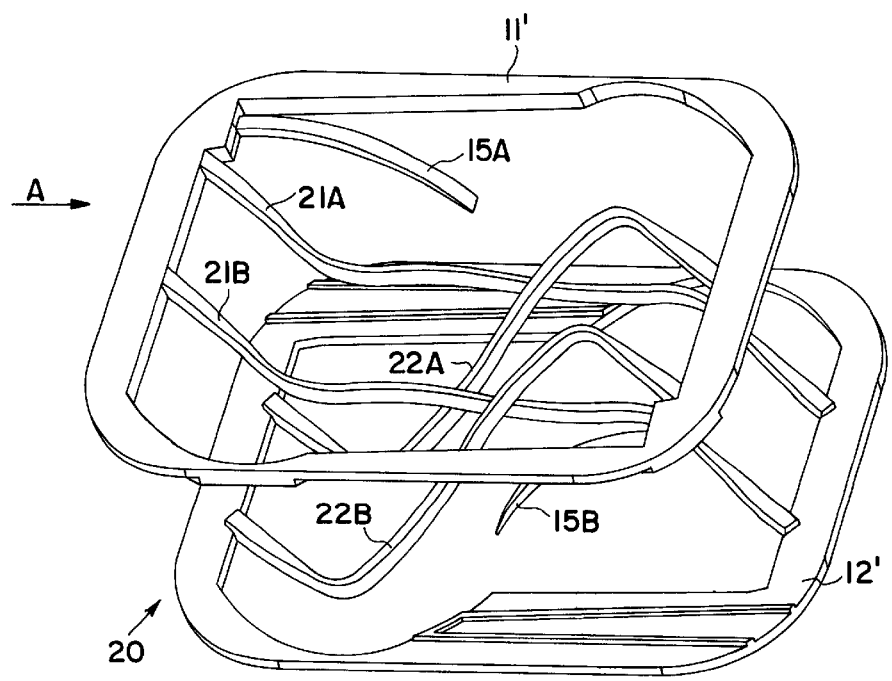
FIG. 5 shows a variant of the spring element with an S-triangle-bow shape.

In FIG. 5 there is shown a variant 20 of the spring element 10 with S-bow-shape individual elements according to FIG. 1, in which the S-circle or S-sine bow shape has been replaced by an S-triangle bow shape. In particular in the tip region of the S-triangle-bow-shape individual elements 21A and B and 22A and B, a width reduction in the cross section of the individual elements is necessary if plastic is used as the material for the spring. Unlike the configuration of the spring element in FIG. 1 here instead of 3 S-bow-shape individual elements there are 4 S-triangle-bow-shape individual elements 21A and B and 22A and B. Between the circle-bow shape and the triangle bow-shape, all kinds of, for example, parabola-bow shapes or other bow shapes can be used. The frame parts are denoted in FIG. 5 by 11' and 12'. The further individual elements are again denoted by 15A and 15B.

Figure 5A:
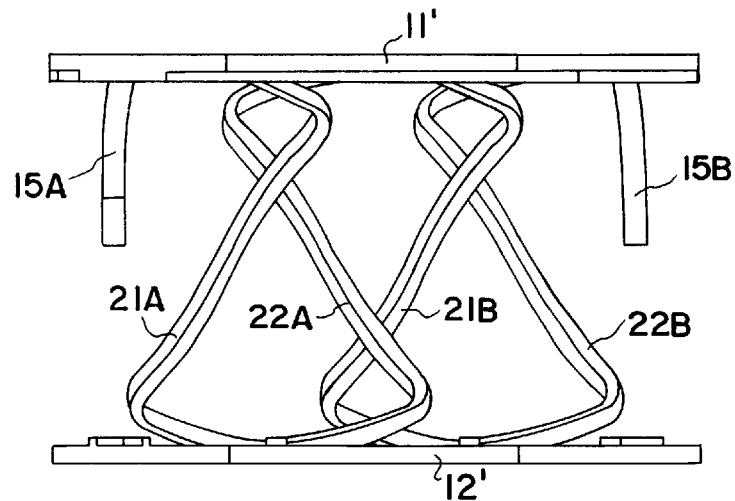
FIG. 5A shows a view A of the spring element according to FIG. 5.

In FIG. 5A there is in turn represented a view (rotated) from the direction A in FIG. 5.

Figure 5B:
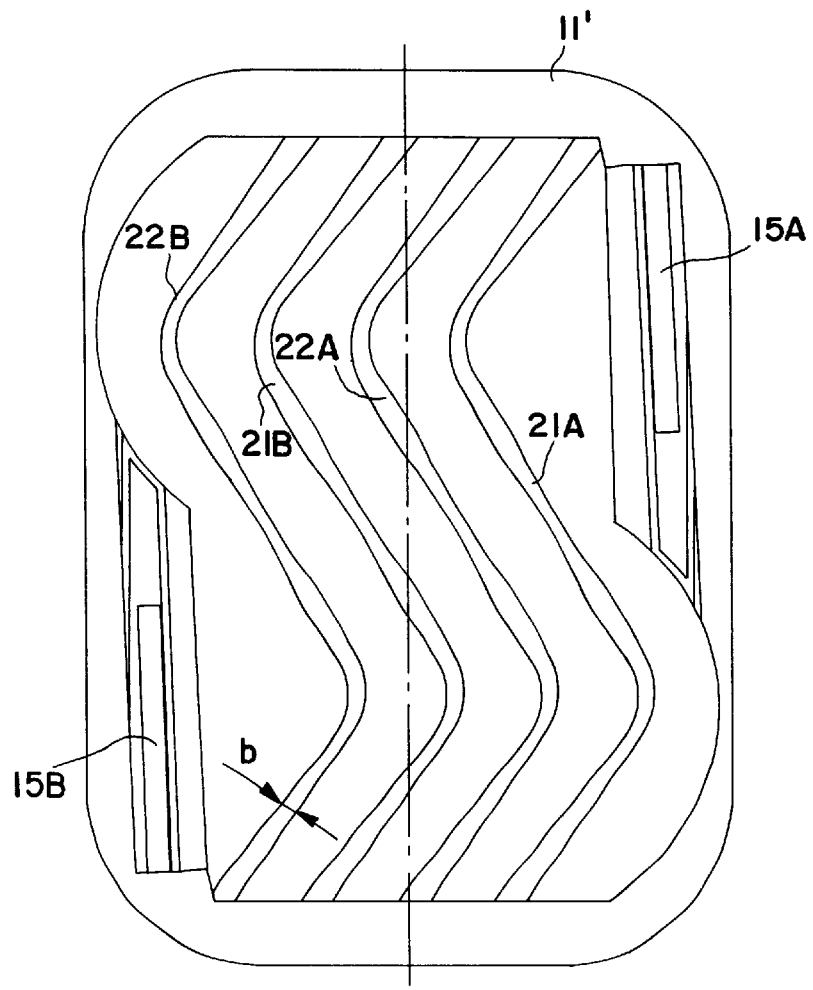
FIG. 5B shows a plan view of a spring element according to FIG. 5.

In FIG. 5B, the S-triangle-bow-shape individual elements 22B, 21B, 22A and 21A can be seen in the frame part 11'. The differing widths b over the length of each of the individual elements can also be seen well here.

Figure 6:
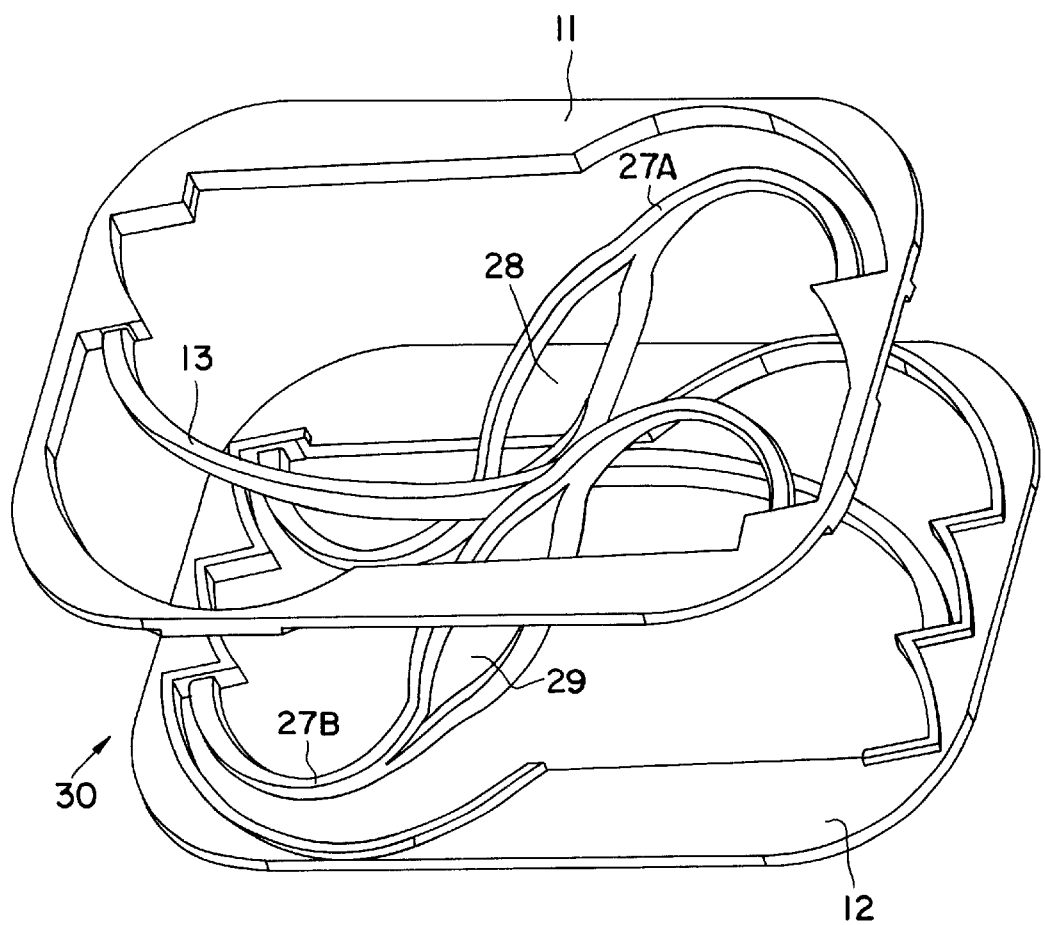
FIG. 6 shows a further variant of the spring element with an integrated spring loop part.

In FIG. 6 there is represented the variant 30 of a spring element 10 with two side elements 27A and B and in each case an integrated loop part 28 and 29, respectively, the latter comprising a spring loop which lies in the central region of the S-bow-shape individual part (27A or 27B) and is formed by two parallel springs. These spring loops 28 and 29 formed by parallel springs are intended, like the springs 15A and 15B in FIG. 1, to ensure that a rising spring-force characteristic approximately compensates for the falling characteristic of the S-bow-shape spring (individual elements 27A and B and 13), in order to realize an approximately constant spring force over a substantial part of the overall spring travel of the spring element.

The shape and size of the spring loop as well as the cross sections of the parallel springs forming the loop can be suitably chosen and set. In the examples shown, it is also intended approximately for the part with constant spring force to begin from half the overall spring travel.

Figure 7:
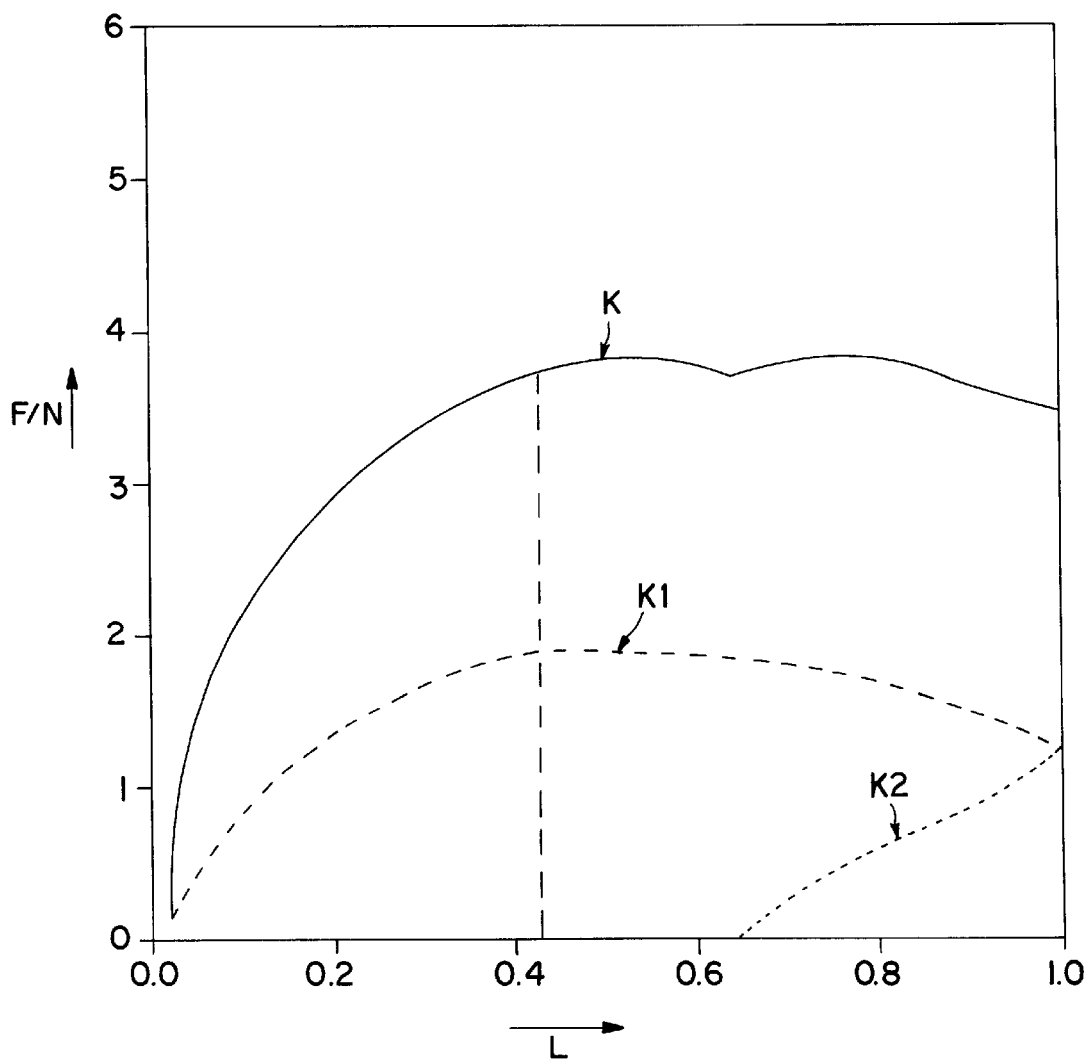
FIG. 7 shows the spring characteristic of the spring elements according to the invention.

FIG. 7 shows a spring characteristic K which is realized by means of the spring element configuration 10 or 20 or 30 in FIGS. 1, 5 and 6, has a rising shape over approximately 40% (0.4 L) of the overall spring length (1 L) and then has a rather flat part (approximately constant spring force F) up to about 0.8 L, to fall slightly thereafter between 0.8 L and 1 L. The spring force F is approximately constant in the range from about 3.7 N to about 3.8 N.

The characteristic K results from the characteristic K1, which is represented in the lower part of the diagram, rises and falls approximately in the form of a parabola and is produced by the individual elements 14A and B or by the individual element 13 or the individual elements 21A and B or 22A and B or 27A and B, and the characteristic K2, which begins at approximately 0.65 L, rises likewise in the form of a parabola and is produced by the further individual elements 15A and B or the spring loops 28 and 29. The characteristic K is obtained as the resultant. By the choice of the springs for the further individual elements 15A and 15B or the spring loops 28 and 29, the angle of the running-out characteristic K in the range from 0.65 L to 1.0 L can be set.

For production by injection molding, only two mold halves are necessary, for receiving the frame parts and/or cover parts, as well as two slides (direction A and the opposite direction). In this case, the configuration with two frame parts is the most favorable, since with the cover parts 16, 16' the mold for the S-bow-shape cutouts is more complicated. The cover parts 16, 16' have a more closed outer surface than the frame parts, with the result that use for ink cartridges with such cover parts or with frame parts and relatively closed cover panels which can be fastened thereto is more expedient. The fastening of the frame parts and/or cover panels to the flexible parts of the ink-receiving space takes place subsequently.

The spring elements described of FIGS. 1, 5 and 6 are suitable for example for use in cartridges of ink-jet printers of the Hewlett-Packard company and ensure outstanding serviceability over their entire service life.

As already mentioned at the beginning, however, similar applications such as for printing-ink cartridges in relatively large-scale printing plants are also possible.

Furthermore, various applications in pneumatic and hydraulic systems, such as for example in motor vehicles and control systems in general, in particular for keeping pressure constant, are possible and advantageous.

The invention relates to ink cartridges with spring elements according to the invention and a spring element itself according to the invention having a relatively constant spring force over a substantial part of the overall spring travel and comprising at least one, two or three or more first individual elements of substantially S-bow or S-curve shape with a first spring characteristic and at least one second individual element of substantially single-bow or curve shape with a second spring characteristic, a resultant spring characteristic with a relatively constant spring force being obtained over the substantial part of the spring travel. Practical embodiments with frame parts and/or cover parts can be favorably produced by injection molding. The individual elements are provided with differing cross-sectional dimensions over their length for reducing stress at bending points susceptible to stress.

The spring elements can be used for ink cartridges for removal of the liquid or paste while at the same time generating negative pressure, or else generally for keeping pressure constant in pneumatic and hydraulic systems in general.

What is claimed is:

1. A spring element adapted for use in ink cartridges, which has a spring characteristic (K) that rises and falls over the overall spring travel (L), which comprises:

two frame parts (11, 12 or 11', 12'), to which are fastened and between which are arranged, at least one individual element having an S-bow shape (13, 14A, 14B or 13, 27A, 27B) or an S-triangle bow shape (21A, 21B, 22A, 22B) and having a spring characteristic (K1) that rises and falls in the form of a parabola over the overall spring travel (L) and at least one further individual element (15A, 15B or 28, 29), which has a single bow shape and a spring characteristic (K2) that begins at approximately 0.65 L and rises to the end of the spring travel (L), wherein said (K) is the resultant of the combination of said (K1) and (K2).

2. A spring element as claimed in claim 1, wherein the at least one further individual element (28, 29) is integrated into the S-bow-shape individual elements.

3. A spring element as claimed in claim 2, wherein the at least one further individual element (28, 29) is designed as a spring loop within the length of the said at least one S-bow-share individual element.

4. A spring element as claimed in claim 1, wherein the spring travel of the at least one further individual element (15A, 15B) is approximately half the overall spring travel (L).

5. A spring element as claimed in claim 1, wherein the spring element (10, 20, 30) is produced in one piece by injection molding.

6. A spring element as claimed in claim 1, wherein the individual element or elements (13, 14A, 14B or 21A, 21B, 22A, 22B or 13, 27A, 27B) has or have over its or their length cross-sectionally differeing widths (b1, b2, b3 in FIG. 3, b in 5B) with approximately constant height and has or have over the length of the spring a substantially constant diffusion of stress at its or their surface.

7. A spring element as claimed in claim 1, wherein the individual elements of S-bow shape comprise a central element (13) and two side elements (14A and 14B or 27A and 27B) spaced equally apart from it, the central element (13) having approximately double the spring force relative to the spring force of each side element (14A and 14B or 27A and 27B).

8. A spring element as claimed in claim 1, wherein there are provided two further individual elements (15A and 15B or 28 and 29) which are effective over about half of the overall spring travel (L) of the spring element (10 or 20 or 30).

9. A spring element as claimed in claim 1, wherein the further individual element or elements (15A and 15B or 27A and 27B) is or are arranged approximately symmetrically with respect to a central element (13).

10. A spring element as claimed in claim 1, wherein at least one of the frame parts (11, 12 or 11', 12') is designed as a cover part (16) with cutouts (17–19), which have the shape of the projection of the S-bow-shape individual elements (13, 14A, 14B) or of the S-triangle-bow-shape individual elements (21A, 21B, 22A, 22B).

11. A spring element as claimed in claim 1, produced from a plastics material which has high crystallinity, a high yield point and, below the yield point, high resilience.

12. A spring element as claimed in claim 11, with a polyacetal, in particular polyoxymethylene, as the material.

13. A spring element as claimed in claim 11, wherein the material is a thermoplastic with resilient properties.

14. A spring element as claimed in claim 1, adapted for use in an ink-jet cartridge.

15. A spring element as claimed in claim 1, adapted for use in a printing-ink cartridge.

16. An ink cartridge comprising a protective housing with a removal head for the ink and an ink-receiving space which is connected to the latter, is partially flexible and in which a spring element as claimed in claim 1 is contained.

17. An ink cartridge as claimed in claim 16, wherein element or elements (13, 14A, 14B, 15A, 15B or 13, 27A, 27B, 28, 29) is or are said frame parts (11, 12 and 11', 12') are connected to flexible parts of said ink-receiving space.

18. An ink cartridge as claimed in claim 17, wherein at least one of the frame parts (11, 12 or 11', 12') is designed as a cover part (16) with cutouts (17–19), which have the shape of the projection of the S-bow-shape individual elements (13, 14A, 14B) or of the S-triangle-bow shape individual elements (21A, 21B, 22A, 22B).

19. An ink cartridge as claimed in claim 16, wherein said spring element is composed of a plastics material which has high crystallinity, a high yield point and, below the yield point, high resilience, in particular of a polyacetal.

* * * * *

UNITED STATES PATENT AND TRADEMARK OFFICE
CERTIFICATE OF CORRECTION

PATENT NO. : 6,273,563 B1
DATED : August 14, 2001
INVENTOR(S) : Martin Voelker

It is certified that error appears in the above-identified patent and that said Letters Patent is hereby corrected as shown below:

Column 6, claim 3,
Line 39, "share" should be -- shape --.

Column 8, claim 17,
Lines 6 and 7, delete "element or elements (13, 14A, 14B, 15A, 15B or 13, 27A, 27B, 28, 29) is or are".

Signed and Sealed this

Nineteenth Day of March, 2002

Attest:

JAMES E. ROGAN
Director of the United States Patent and Trademark Office

Attesting Officer